(12) United States Patent
Schmalz

(10) Patent No.: US 7,080,172 B1
(45) Date of Patent: Jul. 18, 2006

(54) MANAGEMENT OF MEMORY, HARDWARE AND ASSOCIATED DEVICE DRIVERS USING STACKS

(75) Inventor: Joachim Schmalz, Bischweier (DE)

(73) Assignee: Marvell Luternational Ltd. (BM)

( * ) Notice: Subject to any disclaimer, the term of this patent is extended or adjusted under 35 U.S.C. 154(b) by 332 days.

(21) Appl. No.: 10/446,341

(22) Filed: May 27, 2003

(51) Int. Cl.
G06F 13/00 (2006.01)

(52) U.S. Cl. ............... 710/104; 719/327; 719/321; 710/8; 710/10; 709/220; 709/226; 711/2; 711/170

(58) Field of Classification Search ............ 710/2, 710/8, 10, 16, 300, 304, 104; 709/220, 221, 709/222, 226; 718/104; 719/321, 327; 711/1, 711/2, 170
See application file for complete search history.

(56) References Cited

U.S. PATENT DOCUMENTS

| | | | |
|---|---|---|---|
| 5,675,793 A | 10/1997 | Crick et al. | |
| 5,701,476 A | 12/1997 | Fenger | |
| 5,757,386 A * | 5/1998 | Celi et al. | 345/548 |
| 5,787,246 A * | 7/1998 | Lichtman et al. | 709/220 |
| 5,794,035 A * | 8/1998 | Golub et al. | 718/104 |
| 5,819,107 A | 10/1998 | Lichtman et al. | |
| 6,477,612 B1 | 11/2002 | Wang | |
| 6,658,475 B1 * | 12/2003 | Ueno | 709/229 |
| 6,785,888 B1 * | 8/2004 | McKenney et al. | 718/104 |
| 2002/0032719 A1 | 3/2002 | Thomas et al. | |

FOREIGN PATENT DOCUMENTS

JP 2003143175 A * 5/2003

* cited by examiner

Primary Examiner—B. James Peikari

(57) ABSTRACT

Managing memory allocations and de-allocations with a stack, and managing hardware initializations and de-initializations with another stack. A stack may store de-allocate information. Another stack may store de-initialization information. The techniques may be applied to allocating/de-allocating memory for parts of a device driver, initializing/de-initializing parts of hardware, and initializing/de-initializing parts of software.

102 Claims, 4 Drawing Sheets

MANAGEMENT OF MEMORY, HARDWARE AND ASSOCIATED DEVICE DRIVERS USING STACKS

BACKGROUND

A system may have device driver software, which provides instructions on how to control or interface with a device within the system. The driver software may be allocated to different types of memories and subsequently de-allocated. Driver memory allocation may be dynamic.

The device driver may have a plurality of portions or instances. A conventional memory management technique may load each portion or instance of the device driver into an addressed location of a memory. Multiple portions or instances of the device driver may be loaded into various locations of multiple types of memory.

There may be no concerted effort to keep track of (a) the allocated memory location of each driver portion and (b) the order of allocations to multiple types of memory. As a result, when a system closes or shuts down and memory is de-allocated (or "freed"), such de-allocation may not necessarily be complete. This may leave the system in a state where some of the memory is effectively wasted. Incomplete de-allocation may cause memory leakage and/or system crashes and other undesired effects.

SUMMARY

The application relates to techniques for improving memory management for software, such as a device driver, particularly for software written under the Microsoft Windows® operating system. One technique may allocate a plurality of memory locations in a plurality of memory types to store a plurality of device driver portions and use a stack to store de-allocate information. Another technique may allocate a plurality of memory locations in a memory (typically one type of memory) to store a plurality of software parts of a user software application (not related to a device driver) and use a stack to store de-allocate information. The stacks may advantageously help a memory management technique reduce or avoid memory leaks.

Another technique may initialize a plurality of hardware parts in a peripheral device and use a stack to store de-initialize information for the hardware parts.

A system may use one or more of the following stacks: (a) a stack for device driver memory de-allocation, (b) a stack for software memory de-allocation, and (c) a stack for hardware de-initialization. These stacks may be used independently of each other.

An aspect of the application relates to a method comprising: first allocating a first portion of a device driver to a first location of a first memory; if said first allocating is successful, storing first de-allocate information of the first location of the first memory to a stack; second allocating a second portion of the device driver to a first location of a second memory different than the first memory; if said second allocating is successful, storing second de-allocate information of the first location of the second memory to the stack; and if said second allocating is not successful, de-allocating the first location of the first memory using the first de-allocate information in the stack.

Another aspect relates to a method comprising: allocating locations in a plurality of memory types to store portions of a device driver; storing de-allocate information for each successfully-allocated memory location in a stack; and if an allocation is not successful, de-allocating a previously-successful allocated memory location by using de-allocate information in the stack.

Another aspect relates to a method of de-allocating a plurality of memory locations. The method comprises retrieving a first de-allocate information block from a stack; de-allocating a location in a first memory specified by the first de-allocate information block; retrieving a second de-allocate information block from the stack; and de-allocating a location in a second memory specified by the second de-allocate information block.

Another aspect relates to a method comprising: initializing a plurality of hardware parts; storing de-initialize information for each successfully-initialized hardware part in a stack; and if an initialization is not successful, de-initializing a previously-successful initialized hardware part by using the de-initialize information in the stack.

Another aspect relates to a method comprising: allocating a plurality of locations in a memory for a plurality of software parts; storing de-allocate information for each successfully-allocated memory location for a software part in a stack; and if an allocation is not successful, de-allocating a previously-successful allocated memory location for a software part by using de-allocate information in the stack.

Another aspect relates to method comprising: allocating a location in a memory for a free buffer; storing first de-allocate information for the allocated memory location of the free buffer in a first stack; storing data in the free buffer and using the first de-allocate information to de-allocate the memory location of the free buffer; and storing second de-allocate information for the memory location of a used buffer in a second stack.

Another aspect relates to a computer program comprising steps of: first allocating a first portion of a device driver to a first location of a first memory; if said first allocating is successful, storing first de-allocate information of the first location of the first memory to a stack; second allocating a second portion of the device driver to a first location of a second memory different than the first memory; if said second allocating is successful, storing second de-allocate information of the first location of the second memory to the stack; and if said second allocating is not successful, de-allocating the first location of the first memory using the first de-allocate information in the stack.

Another aspect relates to a computer program comprising steps of: allocating locations in a plurality of memory types to store portions of a device driver; storing de-allocate information for each successfully-allocated memory location in a stack; and if an allocation is not successful, de-allocating a previously-successful allocated memory location by using de-allocate information in the stack.

Another aspect relates to a computer program comprising steps of: retrieving a first de-allocate information block from a stack; de-allocating a location in a first memory specified by the first de-allocate information block; retrieving a second de-allocate information block from the stack; and de-allocating a location in a second memory specified by the second de-allocate information block.

Another aspect relates to a computer program comprising steps of: initializing a plurality of hardware parts; storing de-initialize information for each successfully-initialized hardware part in a stack; and if an initialization is not successful, de-initializing a previously-successful initialized hardware part by using the de-initialize information in the stack.

Another aspect relates to a computer program comprising steps of: allocating a plurality of locations in a memory for a plurality of software parts; storing de-allocate information for each successfully-allocated memory location for a software part in a stack; and if an allocation is not successful, de-allocation a previously-successful allocated memory location for a software part by using de-allocate information in the stack.

Another aspect relates to a computer program comprising steps of: allocating a location in a memory for a free buffer; storing first de-allocate information for the allocated memory location of the free buffer in a first stack; storing data in the free buffer and using the first de-allocate information to de-allocate the memory location of the free buffer; and storing second de-allocate information for the memory location of a used buffer in a second stack.

Another aspect relates to a system comprising a first memory, a second memory, a stack, and a controller. The controller is operable to first allocate a first portion of a device driver to a first location of the first memory. If the first allocating is successful, the controller stores first de-allocate information of the first location of the first memory to the stack. The controller second allocates a second portion of the device driver to a first location of the second memory different than the first memory. If the second allocating is successful, the controller stores second de-allocate information of the first location of the second memory to the stack. If the second allocating is not successful, the controller de-allocates the first location of the first memory using the first de-allocate information in the stack.

Another aspect relates to a system comprising a stack and a controller. The controller is operable to (a) allocate locations in a plurality of memory types to store portions of a device driver; (b) store de-allocate information for each successfully-allocated memory location in the stack; and (c) if an allocation is not successful, de-allocate a previously-successful allocated memory location by using de-allocate information in the stack.

Another aspect relates to a system comprising a stack and a controller. The controller is operable to (a) retrieve a first de-allocate information block from the stack; (b) de-allocate a location in a first memory specified by the first de-allocate information block; (c) retrieve a second de-allocate information block from the stack; and (d) de-allocate a location in a second memory specified by the second de-allocate information block.

Another aspect relates to a system comprising a first hardware part, a second hardware part, a stack, and a controller. The controller is operable to (a) initialize the first and second hardware parts, (b) store a first de-initialize information block and a second de-initialize information block in the stack, and (c) if an initialization of the second hardware part is not successful, de-initializing the previously-successful initialized first hardware part by using the first de-initialize information block in the stack.

Another aspect relates to a system comprising a memory, a first software part, a second software part, a stack, and a controller. The controller is operable to (a) allocate locations in the memory for the first and second software parts, (b) store a first de-allocate information block and a second de-allocate information block in the stack, and (c) if an allocation of the second software part is not successful, de-allocate the previously-successful allocated first software part by using the first de-allocate information block in the stack.

Another aspect relates to a system comprising a memory, a first stack, a second stack, and a controller. The controller is operable to (a) allocate a location in the memory for a free buffer; (b) store first de-allocate information for the allocated memory location of the free buffer in the first stack; (c) store data in the free buffer and use the first de-allocate information to de-allocate the memory location of the free buffer; and (d) store second de-allocate information for the memory location of a used buffer in the second stack.

Another aspect relates to a system comprising a first memory means, a second memory means, a de-allocate information storing means, and a controlling means. The controlling means is operable to perform: first allocating a first portion of a device driver to a first location of the first memory means; if said first allocating is successful, storing first de-allocate information of the first location of the first memory means to the de-allocate information storing means; second allocating a second portion of the device driver to a first location of the second memory means different than the first memory means; if said second allocating is successful, storing second de-allocate information of the first location of the second memory means to the de-allocate information storing means; and if said second allocating is not successful, de-allocating the first location of the first memory means using the first de-allocate information in the de-allocate information storing means.

Another aspect relates to a system comprising a stacking means for storing de-allocate information and a controlling means. The controlling means is operable to (a) allocate locations in a plurality of memory means to store portions of a device driver; (b) store de-allocate information for each successfully-allocated memory location in the stacking means; and (c) if an allocation is not successful, de-allocate a previously-successful allocated memory location by using de-allocate information in the stacking means.

Another aspect relates to a system comprising a stacking means for storing de-allocate information blocks and a controlling means operable to (a) retrieve a first de-allocate information block from the stacking means; (b) de-allocate a location in a first memory means specified by the first de-allocate information block; (c) retrieve a second de-allocate information block from the stacking means; and (d) de-allocate a location in a second memory means specified by the second de-allocate information block.

Another aspect relates to a system comprising a first hardware means for performing a first peripheral function; a second hardware means for performing a second peripheral function; a stacking means for storing de-initialize information; and a controlling means operable to (a) initialize the first and second hardware means, (b) store a first de-initialize information block and a second de-initialize information block in the stacking means, and (c) if an initialization of the second hardware means is not successful, de-initializing the previously-successful initialized first hardware means by using the first de-initialize information block in the stacking means.

Another aspect relates to a system comprising a memory means; a first software means for performing a first function; a second software means for performing a second function; a stacking means for storing de-allocation information; and a controlling means operable to (a) allocate locations in the memory for the first and second software means, (b) store a first de-allocate information block and a second de-allocate information block in the stacking means, and (c) if an allocation of the second software means is not successful, de-allocate the previously-successful allocated first software means by using the first de-allocate information block in the stacking means.

Another aspect relates to a system comprising: a memory means; a first stack for storing de-allocate information; a second stack for storing de-allocate information; and a controlling means operable to (a) allocate a location in the memory means for a free buffer; (b) store first de-allocate information for the allocated memory location of the free buffer in the first stacking means; (c) store data in the free buffer and use the first de-allocate information to de-allocate the memory location of the free buffer; and (d) store second de-allocate information for the memory location of a used buffer in the second stacking means.

DETAILED DESCRIPTION

Figure 1A:
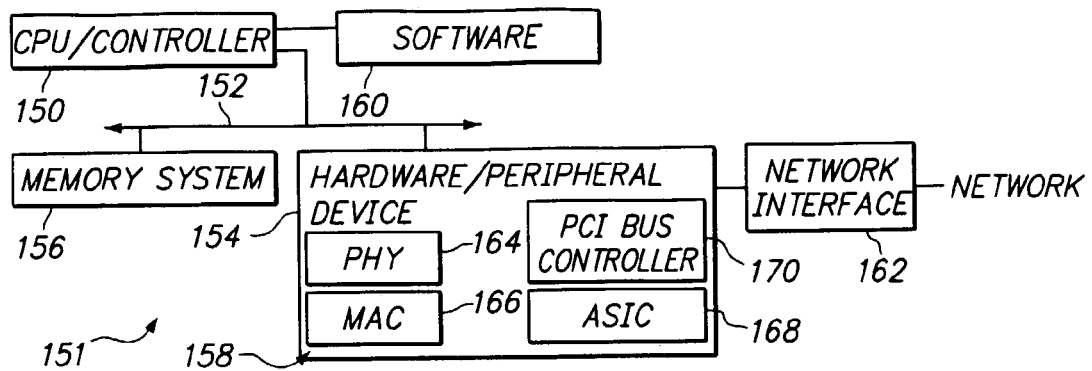
FIG. 1A illustrates a system including a CPU/controller, a bus, a peripheral device, a memory system, hardware, software, and a network interface.

FIG. 1A illustrates a system 151 with a central processing unit (CPU) and/or controller 150, a bus 152, a peripheral device 154, a memory system 156, software 160, and a network interface 162 coupled to the peripheral device 154. The bus 152 may be a peripheral component interconnect (PCI) bus. The system 151 may include other components.

Hardware 158 is shown in FIG. 1A inside the peripheral device 154 but there may be other hardware components apart from the peripheral device 154. The hardware 158 may include a physical (PHY) layer chip or communications hardware 164, a media access controller (MAC) 166, an application specific integrated circuit (ASIC) 168, and a PCI bus controller 170.

The peripheral device 154 may be a network interface device, such as a network adapter or network interface card (NIC), a scanner, a disk drive or any other device that performs a function that is peripheral or external to the CPU 150.

The memory system 156 may comprise a plurality of memory types, as described below with reference to FIG. 2.

The CPU/controller 150 is operable to execute a device driver software, which provides instructions on how to control or interface with the peripheral device 154 in the system 151.

Figure 1B:
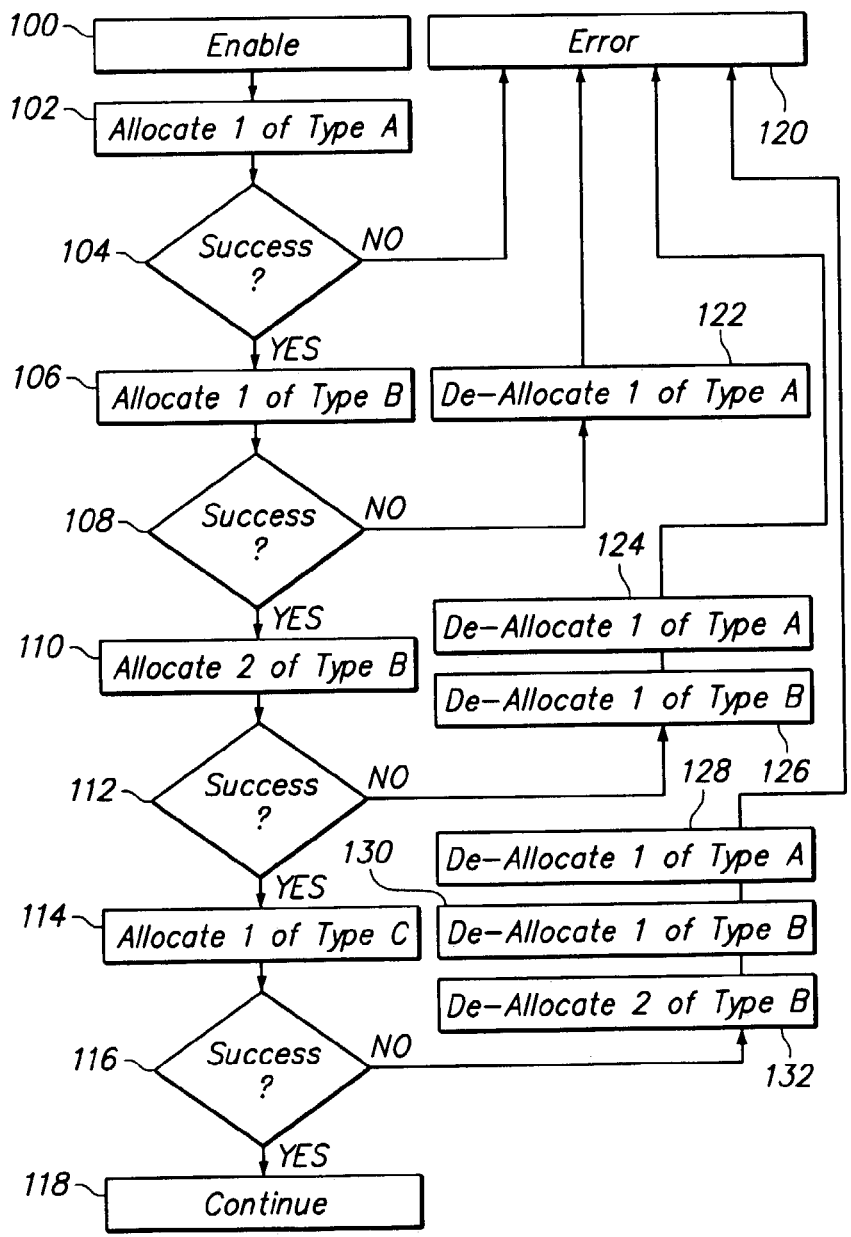
FIG. 1B illustrates a typical technique of allocating and de-allocating a plurality of memory locations.
Figure 2:
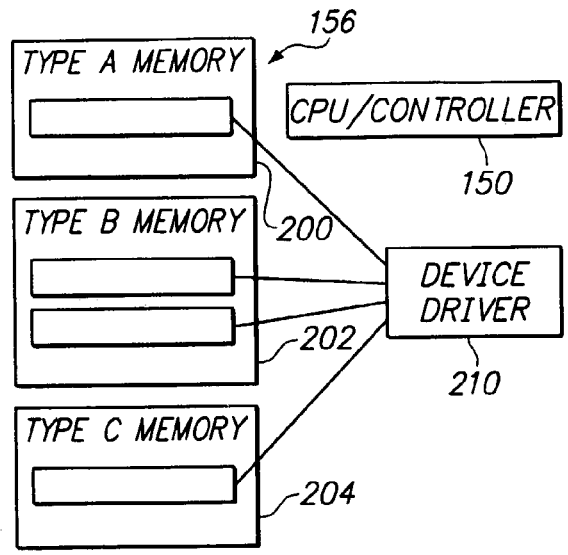
FIG. 2 illustrates a device driver, the CPU/controller and the memory system of FIG. 1A.

FIG. 1B illustrates a typical technique of allocating/loading multiple portions or instances of a device driver into multiple locations/sections of multiple types of memory in the memory system 156 of FIGS. 1A and 2 and de-allocating ("freeing") the memory locations.

For example, a startup phase of a driver initialization may need an operating system to allocate different types of memory for different portions of a device driver to work. A Microsoft Windows operating system may (a) allocate special memory for the peripheral device 154 (e.g., an adapter) in FIG. 1A, (b) allocate memory for several messages, (c) allocate memory for DMA descriptors etc., (d) allocate memory for statistic counters, and (e) allocate memory for message queuing. These driver portions may be stored in different locations of memory, but not all of them are stored in different types of memory. If the driver portions are not successfully allocated to all desired or intended memory locations/sections, the system 151 has to free all the allocated memory locations and leave a driver entry with an error code.

FIG. 2 illustrates a device driver 210, the CPU/controller 150 and the memory system 156 of FIG. 1A. The memory system 156 includes a plurality of memory types, such as type A memory 200, type B memory 202, and type C memory 204. Only three types of memory are shown in FIGS. 1 and 2, but there may be any number of memory types. For example, the memory types may include volatile and non-volatile memory, electrically-erasable programmable read-only memory (EEPROM), static random access memory (SRAM), dynamic RAM (DRAM), flash memory, memory for mapping direct memory accesses (DMAs), memory for registers (e.g., PCI configuration space registers), etc.

The operation of FIG. 1B begins with an Enable state 100. The controller 150 or software/firmware executed by the controller 150 in FIG. 2 attempts to allocate a first portion or instance of the device driver 210 to a first location or section of the type A memory 200 at 102. Block 104 determines whether the attempted allocation 102 has been successful. If the attempted allocation 102 is not successful, e.g., there is no available memory in type A memory 200, an Error state 120 is entered.

If the attempted allocation 102 is successful, an attempt may be made to allocate a portion of the device driver 210 to a first location of the type B memory 202 at 106. Block 108 determines whether the attempted allocation 106 was successful. If the attempted allocation 106 is not successful, block 122 may de-allocate the allocated first location of the type A memory 200. The Error state 120 is entered.

If the attempted allocation 106 is successful, block 110 may attempt to allocate a portion of the device driver 210 to a second location of the type B memory 202. Block 112 determines whether the attempted allocation 110 was successful. If the attempted allocation 110 is not successful, block 126 may de-allocate the allocated first location of the type B memory 202, and block 124 may de-allocate the allocated first location of the type A memory 200. The Error state 120 is entered.

If the attempted allocation 110 is successful, block 114 may attempt to allocate a portion of the device driver 210 to a first location of the type C memory 204. Block 116 determines whether the attempted allocation 114 was successful. If the attempted allocation 114 is not successful, block 132 may de-allocate the allocated second location of the type B memory 202, block 130 de-allocates the allocated first location of the type B memory 202, and block 128 de-allocates the allocated first location of the type A memory 200. The Error state 120 is entered.

If the attempted allocation 114 is successful, a Continue state 118 is entered.

Generally, if a particular allocation attempt (e.g., 110) is not successful, the technique de-allocates ("frees up") all previously successful allocations (e.g., 106, 102) of portions of the device driver in multiple locations of different memory types.

De-allocating multiple locations of multiple memory types A, B, C 200–204 in blocks 122–132 may be challenging for conventional memory management techniques. Code for de-allocation functions 122–132 should be written carefully and without errors or else memory leaks may occur. There may be no concerted effort to keep track of (a) the allocated memory location of each driver portion and (b) the order of allocations to multiple types of memory. As a result, when a system closes or shuts down and memory is de-allocated, such de-allocation may not necessarily be complete. Incomplete de-allocation may cause memory leakage, system crashes and other undesired effects.

Figure 3:
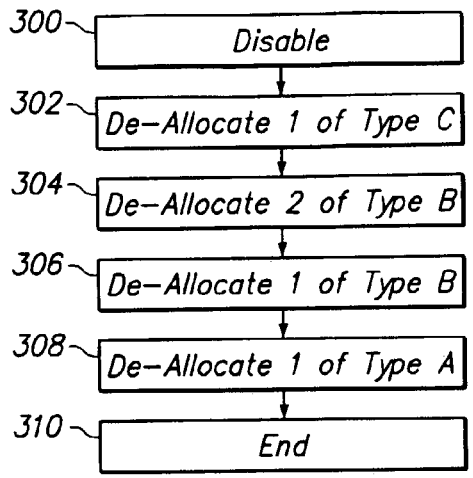
FIG. 3 illustrates a technique of de-allocating locations of a plurality of memories in FIG. 2.

FIG. 3 illustrates a technique of de-allocating locations of a plurality of memories 200–204 in FIG. 2. The technique of FIG. 3 starts at a Disable state 300, e.g., when a device driver is disabled or the system 151 is shut down. The technique of FIG. 3 de-allocates a first location of type C memory 204 at 302, a second location of type B memory 202 at 304, a first location of type B memory 202 at 306, and a first location of type A memory 200 at 308.

Storing De-Allocation Information in a Stack

Figure 4:
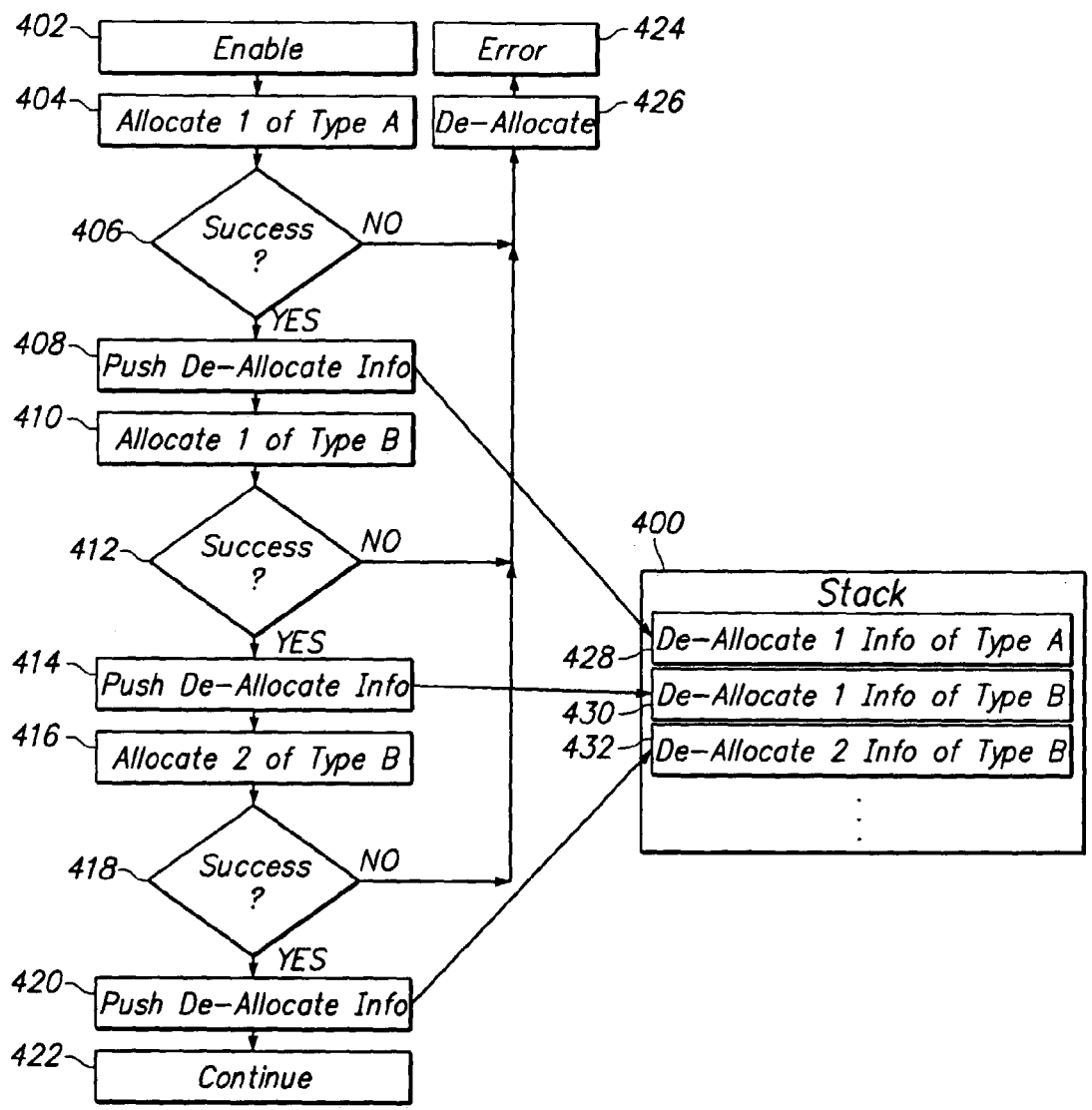
FIG. 4 illustrates another technique of allocating and de-allocating a plurality of memory locations.

FIG. 4 illustrates another technique of allocating and de-allocating a plurality of memory locations. The technique may be implemented by software (e.g., an operating system) or firmware executed by hardware, such as the CPU/controller 150 in FIGS. 1A and 2. The technique of FIG. 4 uses a memory stack 400 to address the problem described above with conventional memory management techniques. The "stack" 400 may be a data structure where entries inserted first are the last ones removed, which may be referred to as FILO (first-in-last-out) or LIFO (last-in-first-out). Alternatively, the stack 400 may be arranged as a first-in-first-out (FIFO) structure. A standard stack enables software (or firmware) to track what the software was doing when the software branched or jumped to a procedure.

In general, after a portion of the device driver 210 is successfully allocated/loaded into a location of a memory 200, 202 or 204, a "de-allocate information" block is written/pushed into the memory stack 400. Each "de-allocate information" block 428–432 in FIG. 4 may include (a) a first pointer or start address of a specific memory location allocated with a portion of the device driver, and (b) a second pointer to a specific de-allocate function or "free memory function" in a software layer above the device driver in an operating system, e.g., NDIS in Microsoft Windows, in program memory. This layer above the device driver may include a plurality of different de-allocate functions, where each de-allocate function corresponds to a particular type of memory 200–204. For example, this layer may include first, second and third de-allocate functions for the type A, type B and type C memory types 200, 202, 204, respectively. Each "de-allocate information" block 428–432 may include other "de-allocate information," such as (c) a size of the allocated memory section, (d) a specific level of memory to which the technique should de-allocate, etc.

The operation of FIG. 4 starts in an Enable state 402, e.g., when an operating system is activated and intends to initiate a device driver 210. Block 404 attempts to allocate a first portion of the device driver 210 (FIG. 2) to a first location of the type A memory 200. Block 406 determines whether the attempted allocation 404 was successful. If the attempted allocation 404 is not successful, block 426 may de-allocate any allocated memory locations (there are none at this point) and proceed to an Error state 424.

If the attempted allocation 404 is successful, block 408 pushes de-allocate information 428 (e.g., (a) a pointer indicating the memory location of the successful allocation 404 and (b) a pointer to a type A memory de-allocate function in the operating system) to the stack 400. Block 410 may attempt to allocate another portion of the device driver 210 to a first location in the type B memory 202. Block 412 determines whether the attempted allocation 410 is successful.

If the attempted allocation 410 is not successful, block 426 may use the de-allocate information 428 in the stack 400 to de-allocate the previously-allocated first location in type A memory 200. The technique proceeds to the Error state 424.

If the attempted allocation 410 is successful, block 414 pushes de-allocate information 430 (e.g., (a) a pointer indicating the memory location of the successful allocation 410 and (b) a pointer to a type B memory de-allocate function in the operating system) to the stack 400. Block 416 may attempt to allocate a portion of the device driver 210 to a second location of the type B memory 202. Block 418 determines whether the attempted allocation 416 is successful.

If the attempted allocation 416 is not successful, block 426 may use the de-allocate information 430 and 428 in the stack 400 to de-allocate the previously-allocated first location of type B memory 202 and first location of type A memory 200. The technique proceeds to the Error state 424.

If the attempted allocation 416 is successful, block 420 pushes de-allocate information 432 (e.g., (a) a pointer indicating the memory location of the successful allocation 416 and (b) a pointer to the type B memory de-allocate function in the operating system) to the stack 400.

Figure 5:
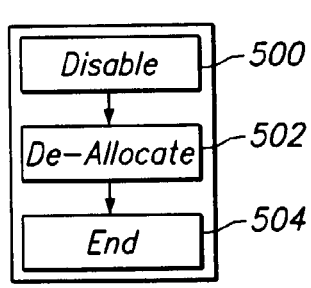
FIG. 5 illustrates a disable state and a de-allocate function.

FIG. 5 illustrates a disable driver state 500, e.g., when the system 151 is shut down, and a de-allocate function 502, which is the same as the de-allocate function 426 in FIG. 4. To de-allocate a portion of the device driver from memory, the operating system reads a memory location from the stack 400 and calls a de-allocate function (from a layer above the device driver). To de-allocate a plurality of device driver portions, the last portion of the device driver that was successfully allocated to a memory location may be de-allocated first, and the first portion of the device driver that was successfully allocated to a memory location may be de-allocated last. The technique of FIG. 4 may reduce or avoid memory leaks by de-allocating the driver in a reverse order to the order that the driver portions were loaded.

Figure 6:
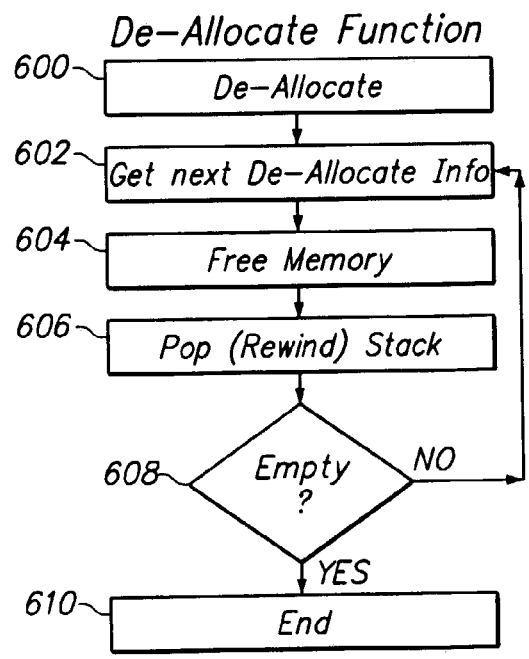
FIG. 6 illustrates a technique for the de-allocate function of FIG. 4 and FIG. 5.

FIG. 6 illustrates a technique for the de-allocate functions 426, 502 of FIGS. 4 and 5. The technique of FIG. 6 starts at a de-allocate state 600. Block 602 retrieves or Gets a next de-allocate information block, e.g., information block 432. Block 604 frees/de-allocates the location of a memory specified by the de-allocate information block, e.g., information block 432, retrieved from the stack 400. Block 606 pops (rewinds) the stack 400. Block 608 determines if the stack 400 is empty. If the stack 400 is not empty, block 602 Gets a next de-allocate information, de-allocate information block 430. If the stack 400 is empty, the technique Ends at 610.

Flexibility to Track Additional Allocations

The CPU/controller 150 of FIG. 1A (e.g., using a Microsoft Windows operating system), may modify the sequence of FIG. 4 to add more allocation attempts to new memory locations in additional memory types. The technique and stack 400 of FIG. 4 is flexible to allow the CPU/controller 150 to dynamically allocate driver portions to additional memory locations. The CPU/controller 150 will automatically push de-allocate information of additional memory allocations to the stack 400 in the order of the allocations. The stack 400 will advantageously track all additional memory allocations and ensure that all allocated memory locations will be de-allocated or freed in a desired order. The technique and stack 400 may reduce or avoid memory leaks, for example, when a system is closed. The stack 400 allows a de-allocate process to be more efficient, as shown by the single de-allocate function 426 in FIG. 4 versus the multiple de-allocate functions 122–132 (e.g., lines of code) in FIG. 1B.

In contrast, if additional memory allocations are added to the technique of FIG. 1B, lines of code for de-allocation functions (e.g., such as functions 122–132) have to be written carefully and without errors or else memory leaks may occur. Memory leaks or other problems caused by improper de-allocation may be hard to detect.

In a Microsoft Windows operating system test, when there are no more memory locations or memory types to allocate the device driver portions, a system may remove/unload a driver from the system by "cleaning up" previously allocated memories 200, 202, 204. The clean-up may occur at any one of a number of different times. Clean-up may automatically occur, e.g., when a system prepares to shut down or restart or after initialization. A user may access the control panel from Microsoft Windows and disable or uninstall a device. This will unload the driver, and the driver has to clean up its memory. Clean-up may also be manually called, e.g., to clean up memory (as an alternative to restarting). The system 151 calls the de-allocate information blocks 428, 430, 432 in the stack 400. The system may use the stack 400 and avoid memory leaks associated with conventional memory management techniques.

Initialize And De-Initialize Hardware

A device driver or other software may initialize and de-initialize different parts of hardware 158 (FIG. 1A) in a peripheral device 154. For example, a driver may initialize a plurality of hardware parts of a Gigabit Ethernet network interface device, such as (a) initializing a physical (PHY) layer chip or communications hardware 164, (b) initializing a media access controller (MAC) 166, (c) initializing an application specific integrated circuit (ASIC) 168, and (d) initializing a peripheral component interconnect (PCI) bus controller 170. The hardware parts may be any component that performs a peripheral or external function apart from the CPU 150.

The stack 400 in FIG. 4 and techniques described above with reference to FIGS. 4–6 may be modified to initialize and de-initialize different parts of hardware 158. The order of hardware de-initialization may be more important than memory de-allocation because hardware parts (FIG. 1A) may depend on each other.

Figure 7:
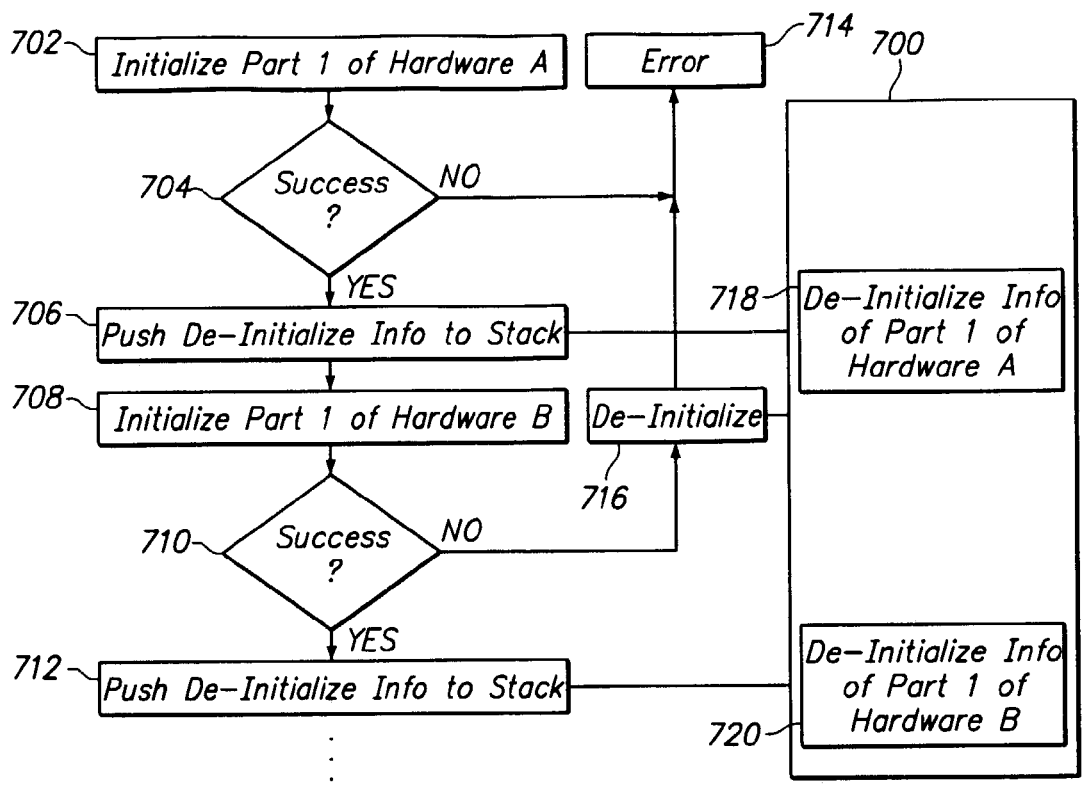
FIG. 7 illustrates a technique of initializing and de-initializing different parts of hardware of FIG. 1A.

FIG. 7 illustrates a technique of initializing and de-initializing different parts of hardware 158 of FIG. 1A. The technique uses a stack 700 similar to stack 400 in FIG. 4 to store de-initialize information for de-initializing different parts of hardware 158. Each block 718, 720 of de-initialize information may include a first pointer, such as a hardware ID number or address, and a second pointer to a de-initialize command or function, even when the function is on the same layer as the device driver. This is because every part of hardware may need a specific de-initialize function. The de-initialize function may be in the device driver or the same layer as the device driver and may not need to be stored in the stack 700. The technique of FIG. 7 may operate in substantially the same manner as the technique of FIG. 4. If an attempted initialization 708 is not successful at 710, previously-initialized hardware are de-initialized at 716 using the stack 700 to "clean up" the hardware.

Allocate And De-Allocate Memory for Software Other Than Device Drivers

An operating system of the CPU 150 in FIG. 1A may allocate and de-allocate portions of memory for different parts of a software application 160 of FIG. 1A, e.g., a user application, which is not a device driver. For example, an operating system may allocate (a) memory for a communications software part, (b) memory for a database, (c) memory for a statistics software part, and (d) memory for a calculations software part. The allocated memory locations/sections may all be in one type of memory, e.g., virtual memory. The stack 400 and techniques described above with reference to FIGS. 4–6 may be modified to allocate and de-allocate memory for different parts of a software application.

Figure 8:
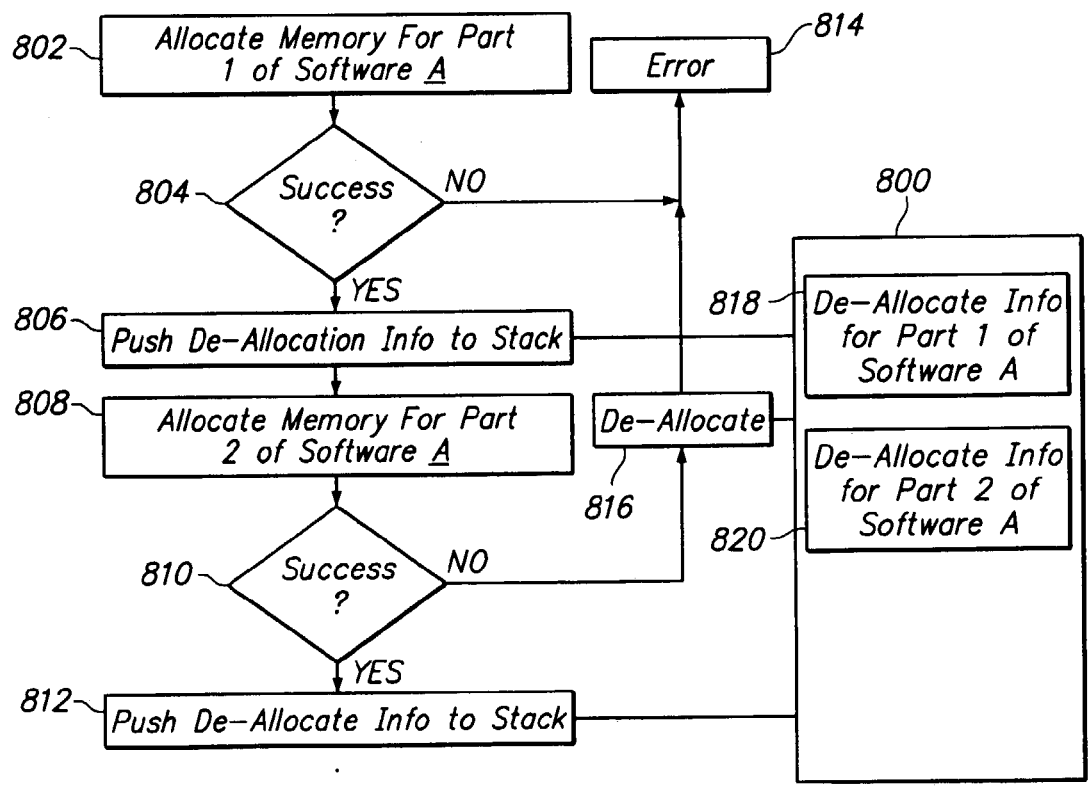
FIG. 8 illustrates a technique of allocating and de-allocating memory locations for different parts of software of FIG. 1A.

FIG. 8 illustrates a technique of allocating and de-allocating memory locations for different parts of a software application 160 of FIG. 1A. The technique uses a stack 800 similar to stack 400 in FIG. 4 to store de-allocate information for de-allocating different parts of software 160. Each block 818, 820 of de-allocate information may include (a) a first pointer or a logical memory address, and (b) a second pointer to a de-allocate function in a layer of the operating system. The stack 400 does not have to store the second pointers to de-allocate functions when only one type of memory is allocated because the operating system will use a common de-allocate function. The technique of FIG. 8 may operate in substantially the same manner as the technique of FIG. 4. If an attempted allocation 808 is not successful at 810, previously-allocated memory portions are de-allocated at 816 using the stack 800 to "clean up" the memory storing the software parts.

As an example, the system 151 may use a RAM memory (e.g., a memory in the memory system 156) to buffer packets to be transmitted to or received from the bus 152 or network interface 162. The operating system and/or driver run by the CPU 150 in the system 151 may use a first stack to store de-allocate information for memory locations in the RAM memory allocated to "free" buffers, which are available to store packets. The system 151 may use a second stack to store de-allocate information for memory locations in the RAM memory allocated to "used" buffers, which currently store packets.

Each de-allocate information block in the first stack or second stack may include a pointer indicating the memory location of a "free" or "used" buffer. The stack may not need to store pointers to a memory de-allocate function because only one type of memory is used. The operating system may use one de-allocate function in a layer (e.g., NDIS) above a driver. Each de-allocate information block may further include (b) a length of the "free" or "used" buffer, (c) a counter of how often the buffer has been used, (d) date and time when buffer was allocated.

The system 151 may use the first and second stacks to manage the RAM memory and determine when to allocate more memory locations in the RAM memory for "free" buffers. This may be called "load balancing." When the system 151 has a heavy load, i.e., a large number of packets are to be transmitted or received, the system 151 may dynamically allocate more "free" buffers in the RAM memory to store packets. For example, when the number of de-allocate information blocks in the "free" stack drops below a pre-determined threshold number, e.g., 10, then the system 151 may allocate more memory locations for "free" buffers, and more entries are added to the first stack possibly until a predetermined number is reached. The first stack (tracking "free" buffers) may be a FIFO or a FILO. The second stack (tracking "used" buffers) should be a FIFO.

As the system 151 sends packets from the "used" buffers of RAM memory across the bus 152 or network interface 162 or the system 151 processes the packets, the load decreases (number of "used" buffers decreases, and number of "free" buffers increases). The system 151 may de-allocate some of the "free" buffers in RAM memory using the de-allocate information in the first stack so the RAM memory can be used for other applications.

Another example may include two stacks with de-allocate information for "free" buffers. One stack has de-allocate information for large "free" buffers, and another stack has de-allocate information for small "free" buffers.

As mentioned above, the entries in each stack 400, 700, 800 (for driver memory de-allocation, for software de-allocation, for hardware de-initialization, for free buffer de-allocation, for used buffer de-allocation) may be modified to suit a user's preferences. The user of a stack can add any number of parameters to the entries in a stack. The user can also specify the type of parameters. All parameters belong to one stack entry. For example, a memory stack may include:

Parameter 1: Pointer to memory area.
Type: Memory Pointer
Parameter 2: Pointer to de-allocate function
Type: Function Pointer
Parameter 3: Time of allocation
Type: Time format
Parameter 4: Date of allocation
Type: Date format
Parameter 5: Software level
Type: integer A number of embodiments have been described. Nevertheless, it will be understood that various modifications may be made without departing from the spirit and scope of the application. For example, more than one stack 400 may be implemented and used. Any of the stacks described above may be a FIFO or FILO. In some situations, it is more practical to use a FIFO. In other situations, it is more practical to use a FILO. Each stack may store de-allocate information for one or more types of memories. Accordingly, other embodiments are within the scope of the following claims.

What is claimed is:

1. A method comprising:
    first allocating a first portion of a device driver to a first location of a first memory;
    if said first allocating is successful, storing first de-allocate information of the first location of the first memory to a stack;
    second allocating a second portion of the device driver to a first location of a second memory different than the first memory;
    if said second allocating is successful, storing second de-allocate information of the first location of the second memory to the stack; and
    if said second allocating is not successful, de-allocating the first location of the first memory using the first de-allocate information in the stack.

2. The method of claim 1, wherein the first de-allocate information comprises:
    a first pointer to the first location of the first memory; and
    a second pointer to a first de-allocate function, which includes instructions for de-allocating a location of the first memory.

3. The method of claim 2, wherein the second pointer points to a de-allocate function in a layer of the operating system, the layer being above the device driver.

4. The method of claim 1, wherein the first de-allocate information comprises:
    a pointer to the first location of the first memory; and
    information indicative of a length of allocated memory.

5. The method of claim 1, further comprising:
    third allocating a third portion of the device driver to a second location of the second memory;
    if the third allocating is successful, storing third de-allocate information in the stack, the third de-allocate information block comprising (a) a pointer to the second memory location in the second memory and (b) a pointer to a second de-allocate function, which includes instructions for de-allocating a location of the second memory; and
    if said third allocating is not successful, de-allocating the first location of the second memory and de-allocating the first location of the first memory using first and second de-allocate information in the stack.

6. The method of claim 1, wherein the first and second portions of the device driver comprise separate instances of the device driver.

7. A method comprising:
    allocating locations in a plurality of memory types to store portions of a device driver;
    storing de-allocate information for each successfully-allocated memory location in a stack; and
    if an allocation is not successful, de-allocating a previously-successful allocated memory location by using de-allocate information in the stack.

8. The method of claim 7, wherein if an allocation is not successful, de-allocating all previously-successful allocated memory locations by using de-allocate information in the stack.

9. A method of de-allocating a plurality of memory locations, the method comprising:
    retrieving a first de-allocate information block from a stack;
    de-allocating a location in a first memory specified by the first de-allocate information block;
    retrieving a second de-allocate information block from the stack; and
    de-allocating a location in a second memory specified by the second de-allocate information block.

10. The method of claim 9, further comprising:
    retrieving a third de-allocate information block from the stack; and
    de-allocating a second location in the second memory specified by the third de-allocate information block.

11. A method comprising:
    initializing a plurality of hardware parts;
    storing de-initialize information for each successfully-initialized hardware part in a stack; and
    if an initialization is not successful, de-initializing a previously-successful initialized hardware part by using the de-initialize information in the stack.

12. The method of claim 11, wherein the hardware parts are within a peripheral device.

13. The method of claim 11, wherein the hardware parts are selected from a group consisting of a physical (PHY) layer chip, a media access controller (MAC), an application specific integrated circuit (ASIC), and a peripheral component interconnect (PCI) bus controller.

14. The method of claim 11, wherein the stack is a first-in-last-out structure.

15. The method of claim 11, wherein the de-initialize information comprises:
- a first de-initialize information block comprising a first pointer to a first hardware part and a second pointer to a de-initialize function; and
- a second de-initialize information block comprising a third pointer to a second hardware part and a fourth pointer to a de-initialize function.

16. A method comprising:
- allocating a plurality of locations in a memory for a plurality of software parts;
- storing de-allocate information for each successfully-allocated memory location for a software part in a stack; and
- if an allocation is not successful, de-allocating a previously-successful allocated memory location for a software part by using de-allocate information in the stack.

17. The method of claim 16, wherein the plurality of software parts are selected from a group consisting of a communications software part, a database, a statistics software part, and a calculations software part.

18. The method of claim 16, wherein the de-allocate information comprises:
- a first de-initialize allocate information block comprising a pointer to a first location in the memory allocated for a first software part; and
- a second de-initialize allocate information block comprising a pointer to a second location in the memory allocated for a second software part.

19. A method comprising:
- allocating a location in a memory for a free buffer;
- storing first de-allocate information for the allocated memory location of the free buffer in a first stack;
- storing data in the free buffer and using the first de-allocate information to de-allocate the memory location of the free buffer; and
- storing second de-allocate information for the memory location of a used buffer in a second stack.

20. The method of claim 19, wherein the first de-allocate information comprises a pointer to the memory location of the free buffer.

21. The method of claim 20, wherein the first de-allocate information further comprises a counter of how often the memory location has been used.

22. The method of claim 20, wherein the first de-allocate information further comprises a date and time when the memory location was allocated.

23. The method of claim 19, further comprising using the second de-allocate information to de-allocate the memory location of the used buffer; and storing first de-allocate information for the allocated memory location of the free buffer in the first stack again.

24. The method of claim 19, further comprising adding at least one de-allocate information to the first stack when a number of free buffers falls below a pre-determined threshold number.

25. A computer program encoded in a computer-readable medium, which when executed by a computer, performs steps of:
- first allocating a first portion of a device driver to a first location of a first memory;
- if said first allocating is successful, storing first de-allocate information of the first location of the first memory to a stack;
- second allocating a second portion of the device driver to a first location of a second memory different than the first memory;
- if said second allocating is successful, storing second de-allocate information of the first location of the second memory to the stack; and
- if said second allocating is not successful, de-allocating the first location of the first memory using the first de-allocate information in the stack.

26. The computer program of claim 25, wherein the first de-allocate information comprises:
- a first pointer to the first location of the first memory; and
- a second pointer to a first de-allocate function, which includes instructions for de-allocating a location of the first memory.

27. The computer program of claim 26, wherein the second pointer points to a de-allocate function in a layer of the operating system, the layer being above the device driver.

28. The computer program of claim 25, wherein the first de-allocate information comprises:
- a pointer to the first location of the first memory; and
- information indicative of a length of allocated memory.

29. The computer program of claim 25, further comprising steps of:
- third allocating a third portion of the device driver to a second location of the second memory;
- if the third allocating is successful, storing third de-allocate information in the stack, the third de-allocate information block comprising (a) a pointer to the second memory location in the second memory and (b) a pointer to a second de-allocate function, which includes instructions for de-allocating a location of the second memory; and
- if said third allocating is not successful, de-allocating the first location of the second memory and de-allocating the first location of the first memory using first and second de-allocate information in the stack.

30. The computer program of claim 25, wherein the first and second portions of the device driver comprise separate instances of the device driver.

31. A computer program encoded in a computer-readable medium, which when executed by a computer, performs steps of:
- allocating locations in a plurality of memory types to store portions of a device driver;
- storing de-allocate information for each successfully-allocated memory location in a stack; and
- if an allocation is not successful, de-allocating a previously-successful allocated memory location by using de-allocate information in the stack.

32. The computer program of claim 31, wherein if an allocation is not successful, de-allocating all previously-successful allocated memory locations by using de-allocate information in the stack.

33. A computer program encoded in a computer-readable medium, which when executed by a computer, performs steps of:
- retrieving a first de-allocate information block from a stack;
- de-allocating a location in a first memory specified by the first de-allocate information block;
- retrieving a second de-allocate information block from the stack; and
- de-allocating a location in a second memory specified by the second de-allocate information block.

34. The computer program of claim 33, further comprising:
- retrieving a third de-allocate information block from the stack; and de-allocating a second location in the second memory specified by the third de-allocate information block.

35. A computer program encoded in a computer-readable medium, which when executed by a computer, performs steps of:
   initializing a plurality of hardware parts;
   storing de-initialize information for each successfully-initialized hardware part in a stack; and
   if an initialization is not successful, de-initializing a previously-successful initialized hardware part by using the de-initialize information in the stack.

36. The computer program of claim 35, wherein the hardware parts are within a peripheral device.

37. The computer program of claim 35, wherein the hardware parts are selected from a group consisting of a physical (PHY) layer chip, a media access controller (MAC), an application specific integrated circuit (ASIC), and a peripheral component interconnect (PCI) bus controller.

38. The computer program of claim 35, wherein the stack is a first-in-last-out structure.

39. The computer program of claim 35, wherein the de-initialize information comprises:
   a first de-initialize information block comprising a first pointer to a first hardware part and a second pointer to a de-initialize function; and
   a second de-initialize information block comprising a third pointer to a second hardware part and a fourth pointer to a de-initialize function.

40. A computer program encoded in a computer-readable medium, which when executed by a computer, performs steps of:
   allocating a plurality of locations in a memory for a plurality of software parts;
   storing de-allocate information for each successfully-allocated memory location for a software part in a stack; and
   if an allocation is not successful, de-allocation a previously-successful allocated memory location for a software part by using de-allocate information in the stack.

41. The computer program of claim 40, wherein the plurality of software parts are selected from a group consisting of a communications software part, a database, a statistics software part, and a calculations software part.

42. The computer program of claim 40, wherein the de-allocate information comprises:
   a first de-initialize allocate information block comprising a pointer to a first location in the memory allocated for a first software part; and
   a second de-initialize allocate information block comprising a pointer to a second location in the memory allocated for a second software part.

43. A computer program encoded in a computer-readable medium, which when executed by a computer, performs steps of:
   allocating a location in a memory for a free buffer;
   storing first de-allocate information for the allocated memory location of the free buffer in a first stack;
   storing data in the free buffer and using the first de-allocate information to de-allocate the memory location of the free buffer; and
   storing second de-allocate information for the memory location of a used buffer in a second stack.

44. The computer program of claim 43, wherein the first de-allocate information comprises a pointer to the memory location of the free buffer.

45. The computer program of claim 43, wherein the first de-allocate information further comprises a counter of how often the memory location has been used.

46. The computer program of claim 43, wherein the first de-allocate information further comprises a date and time when the memory location was allocated.

47. The computer program of claim 43, further comprising using the second de-allocate information to de-allocate the memory location of the used buffer; and
   storing first de-allocate information for the allocated memory location of the free buffer in the first stack again.

48. The computer program of claim 43, further comprising adding at least one de-allocate information to the first stack when a number of free buffers falls below a pre-determined threshold number.

49. A system comprising:
   a first memory;
   a second memory;
   a stack; and
   a controller operable to perform:
      first allocating a first portion of a device driver to a first location of the first memory;
      if said first allocating is successful, storing first de-allocate information of the first location of the first memory to the stack;
      second allocating a second portion of the device driver to a first location of the second memory different than the first memory;
      if said second allocating is successful, storing second de-allocate information of the first location of the second memory to the stack; and
      if said second allocating is not successful, de-allocating the first location of the first memory using the first de-allocate information in the stack.

50. The system of claim 49, wherein the first de-allocate information comprises (a) a first pointer to the first location in the first memory, and (b) a second pointer to a first de-allocate function, which includes instructions for de-allocating a location of the first memory.

51. The system of claim 50, wherein the second pointer points to a de-allocate function in a layer of the operating system, the layer being above the device driver.

52. The system of claim 49, wherein the first de-allocate information comprises:
   a pointer to the first location of the first memory; and
   information indicative of a length of allocated memory.

53. The system of claim 49, wherein the controller is further operable to perform:
   third allocating a third portion of the device driver to a second location of the second memory;
   if the third allocating is successful, storing third de-allocate information in the stack, the third de-allocate information block comprising (a) a pointer to the second memory location in the second memory and (b) a pointer to a second de-allocate function, which includes instructions for de-allocating a location of the second memory; and
   if said third allocating is not successful, de-allocating the first location of the second memory and de-allocating the first location of the first memory using first and second de-allocate information in the stack.

54. The system of claim 49, wherein the first and second portions of the device driver comprise separate instances of the device driver.

55. The system of claim 49, wherein the stack is a first-in-first-out structure.

56. The system of claim 49, wherein the stack is a first-in-last-out structure.

57. A system comprising:
   a stack; and
   a controller operable to (a) allocate locations in a plurality of memory types to store portions of a device driver; (b) store de-allocate information for each successfully-allocated memory location in the stack; and (c) if an allocation is not successful, de-allocate a previously-successful allocated memory location by using de-allocate information in the stack.

58. The system of claim 57, wherein if an allocation is not successful, the controller is operable to de-allocate all previously-successful allocated memory locations by using de-allocate information in the stack.

59. A system comprising:
   a stack; and
   a controller operable to (a) retrieve a first de-allocate information block from the stack; (b) de-allocate a location in a first memory specified by the first de-allocate information block; (c) retrieve a second de-allocate information block from the stack; and (d) de-allocate a location in a second memory specified by the second de-allocate information block.

60. The system of claim 59, wherein the controller is operable to retrieve a third de-allocate information block from the stack; and de-allocate a second location in the second memory specified by the third de-allocate information block.

61. A system comprising:
   a first hardware part;
   a second hardware part;
   a stack; and
   a controller operable to (a) initialize the first and second hardware parts, (b) store a first de-initialize information block and a second de-initialize information block in the stack, and (c) if an initialization of the second hardware part is not successful, de-initializing the previously-successful initialized first hardware part by using the first de-initialize information block in the stack.

62. The system of claim 61, wherein the hardware parts are selected from a group consisting of a physical (PHY) layer chip, a media access controller (MAC), an application specific integrated circuit (ASIC), and a peripheral component interconnect (PCI) bus controller.

63. The system of claim 61, wherein the stack is a first-in-last-out structure.

64. The system of claim 61, wherein the first de-initialize information block comprises a first pointer to a first hardware part and a second pointer to a de-initialize function; the second de-initialize information block comprising a third pointer to a second hardware part and a fourth pointer to a de-initialize function.

65. The system of claim 61, wherein the first and second hardware parts are within a peripheral device.

66. The system of claim 61, wherein the first and second hardware parts are within a network interface device.

67. A system comprising:
   a memory;
   a first software part;
   a second software part;
   a stack; and
   a controller operable to (a) allocate locations in the memory for the first and second software parts, (b) store a first de-allocate information block and a second de-allocate information block in the stack, and (c) if an allocation of the second software part is not successful, de-allocate the previously-successful allocated first software part by using the first de-allocate information block in the stack.

68. The system of claim 67, wherein the plurality of software parts are selected from a group consisting of a communications software part, a database, a statistics software part, and a calculations software part.

69. The system of claim 67, wherein the first de-allocate information block comprises a pointer to a first location in the memory allocated for the first software part; the second de-allocate information block comprising a pointer to a second location in the memory allocated for the second software part.

70. A system comprising:
   a memory;
   a first stack;
   a second stack; and
   a controller operable to (a) allocate a location in the memory for a free buffer; (b) store first de-allocate information for the allocated memory location of the free buffer in the first-stack; (c) store data in the free buffer and use the first de-allocate information to de-allocate the memory location of the free buffer; and (d) store second de-allocate information for the memory location of a used buffer in the second stack.

71. The system of claim 70, wherein the first de-allocate information comprises a pointer to the memory location of the free buffer.

72. The system of claim 70, wherein the first de-allocate information further comprises a counter of how often the memory location has been used.

73. The system of claim 70, wherein the first de-allocate information further comprises a date and time when the memory location was allocated.

74. The system of claim 70, wherein the controller is further operable to use the second de-allocate information to de-allocate the memory location of the used buffer; and store first de-allocate information for the allocated memory location of the free buffer in the first stack again.

75. The system of claim 70, wherein the controller is further operable to add at least one de-allocate information to the first stack when a number of free buffers falls below a pre-determined threshold number.

76. A system comprising:
   a first memory means;
   a second memory means;
   a de-allocate information storing means; and
   a controlling means operable to perform:
      first allocating a first portion of a device driver to a first location of the first memory means;
      if said first allocating is successful, storing first de-allocate information of the first location of the first memory means to the de-allocate information storing means;
      second allocating a second portion of the device driver to a first location of the second memory means different than the first memory means;
      if said second allocating is successful, storing second de-allocate information of the first location of the second memory means to the de-allocate information storing means; and
      if said second allocating is not successful, de-allocating the first location of the first memory means using the first de-allocate information in the de-allocate information storing means.

77. The system of claim 76, wherein the first de-allocate information comprises (a) a first pointing means to the first location in the first memory means, and (b) a second pointing means to a first de-allocate function, which includes instructions for de-allocating a location of the first memory means.

78. The system of claim 77, wherein the second pointing means points to a de-allocate function in a layer of the operating system, the layer being above the device driver.

79. The system of claim 76, wherein the first de-allocate information comprises: (a) a pointing means to the first location of the first memory means; and (b) information indicative of a length of allocated memory.

80. The system of claim 76, wherein the controlling means is further operable to perform:
  third allocating a third portion of the device driver to a second location of the second memory means;
  if the third allocating is successful, storing third de-allocate information in the de-allocate information storing means, the third de-allocate information block comprising (a) a pointing means to the second memory location in the second memory means and (b) a pointing means to a second de-allocate function, which includes instructions for de-allocating a location of the second memory means; and
  if said third allocating is not successful, de-allocating the first location of the second memory means and de-allocating the first location of the first memory means using first and second de-allocate information in the de-allocate information storing means.

81. The system of claim 76, wherein the first and second portions of the device driver comprise separate instances of the device driver.

82. The system of claim 76, wherein the stacking means is a first-in-first-out structure.

83. The system of claim 76, wherein the stacking means is a first-in-last-out structure.

84. A system comprising:
  a stacking means for storing de-allocate information; and
  a controlling means operable to (a) allocate locations in a plurality of memory means to store portions of a device driver; (b) store de-allocate information for each successfully-allocated memory location in the stacking means; and (c) if an allocation is not successful, de-allocate a previously-successful allocated memory location by using de-allocate information in the stacking means.

85. The system of claim 84, wherein if an allocation is not successful, the controlling means is operable to de-allocate all previously-successful allocated memory locations by using de-allocate information in the stacking means.

86. A system comprising:
  a stacking means for storing de-allocate information blocks; and
  a controlling means operable to (a) retrieve a first de-allocate information block from the stacking means;
  (b) de-allocate a location in a first memory means specified by the first de-allocate information block; (c) retrieve a second de-allocate information block from the stacking means; and (d) de-allocate a location in a second memory means specified by the second de-allocate information block.

87. The system of claim 86, wherein the controlling means is operable to retrieve a third de-allocate information block from the stacking means; and de-allocate a second location in the second memory means specified by the third de-allocate information block.

88. A system comprising:
  a first hardware means for performing a first peripheral function;
  a second hardware means for performing a second peripheral function;
  a stacking means for storing de-initialize information; and
  a controlling means operable to (a) initialize the first and second hardware means, (b) store a first de-initialize information block and a second de-initialize information block in the stacking means, and (c) if an initialization of the second hardware means is not successful, de-initializing the previously-successful initialized first hardware means by using the first de-initialize information block in the stacking means.

89. The system of claim 88, wherein the first and second hardware means are selected from a group consisting of a physical (PHY) layer chip, a media access controller (MAC), an application specific integrated circuit (ASIC), and a peripheral component interconnect (PCI) bus, controller.

90. The system of claim 88, wherein the stacking means is a first-in-last-out structure.

91. The system of claim 88, wherein the first de-initialize information block comprises a first pointing means to the first hardware means and a second pointing means to a de-initialize function; the second de-initialize information block comprising a third pointing means to the second hardware means and a fourth pointing means to a de-initialize function.

92. The system of claim 88, wherein the first and second hardware means are within a peripheral device.

93. The system of claim 88, wherein the first and second hardware means are within a network interface device.

94. A system comprising:
  a memory means;
  a first software means for performing a first function;
  a second software means for performing a second function;
  a stacking means for storing de-allocation information; and
  a controlling means operable to (a) allocate locations in the memory for the first and second software means, (b) store a first de-allocate information block and a second de-allocate information block in the stacking means, and (c) if an allocation of the second software means is not successful, de-allocate the previously-successful allocated first software means by using the first de-allocate information block in the stacking means.

95. The system of claim 94, wherein the first and second software means are selected from a group consisting of a communications software part, a database, a statistics software part, and a calculations software part.

96. The system of claim 94, wherein the first de-allocate information block comprises a pointing means to a first location in the memory means allocated for the first software means; the second de-allocate information block comprising (a) a pointing means to a second location in the memory allocated for the second software means.

97. A system comprising:
  a memory means;
  a first stack for storing de-allocate information;
  a second stack for storing de-allocate information; and
  a controlling means operable to (a) allocate a location in the memory means for a free buffer; (b) store first de-allocate information for the allocated memory location of the free buffer in the first stacking means; (c) store data in the free buffer and use the first de-allocate information to de-allocate the memory location of the free buffer; and (d) store second de-allocate information for the memory location of a used buffer in the second stacking means.

98. The system of claim 97, wherein the first de-allocate information comprises a pointing means to the memory means location of the free buffer.

99. The system of claim 97, wherein the first de-allocate information further comprises a counting means of how often the memory means location has been used.

100. The system of claim 97, wherein the first de-allocate information further comprises a date and time when the memory means location was allocated.

101. The system of claim 97, wherein the controlling means is further operable to use the second de-allocate information to de-allocate the memory location of the used buffer; and store first de-allocate information for the allocated memory location of the free buffer in the first stacking means again.

102. The system of claim 97, wherein the controlling means is further operable to add at least one de-allocate information to the first stacking means when a number of free buffers falls below a pre-determined threshold number.

* * * * *